United States Patent [19]

Stahel

[11] Patent Number: 4,535,649
[45] Date of Patent: Aug. 20, 1985

[54] ANTI-SLIP HANDLEBAR GRIP

[75] Inventor: Alwin J. Stahel, St. Paul, Minn.

[73] Assignee: Drag Specialties, Inc., Minnetonka, Minn.

[21] Appl. No.: 461,755

[22] Filed: Jan. 28, 1983

[51] Int. Cl.³ .............................................. B62K 21/26
[52] U.S. Cl. .................... 74/551.9; 74/551.1
[58] Field of Search ............... 74/551.1, 551.9, 558, 74/558.5, 563; 16/110 R, DIG. 12

[56] References Cited

U.S. PATENT DOCUMENTS

| D. 274,122 | 6/1984 | Stahel et al. | D8/303 |
|---|---|---|---|
| 581,287 | 4/1897 | Hodgson . | |
| 594,939 | 12/1897 | Fairbanks . | |
| 612,057 | 10/1898 | Richter | 74/551.9 |
| 643,644 | 2/1900 | Gaylor | 74/551.9 |
| 3,189,069 | 6/1965 | Stowell | 16/110 R |
| 3,205,729 | 9/1965 | Golden | 74/551 |
| 3,344,684 | 10/1967 | Steere, Jr. et al. | 74/551.9 |
| 3,606,325 | 9/1971 | Lamkin et al. | 74/551.9 |
| 4,416,166 | 11/1983 | Jannard et al. | 74/551.9 |
| 4,421,181 | 12/1983 | Andersson et al. | 74/551.9 |

FOREIGN PATENT DOCUMENTS

| 2808 | of 1896 | United Kingdom | 74/551.9 |
|---|---|---|---|
| 24056 | of 1897 | United Kingdom | 74/551.9 |
| 651817 | 4/1951 | United Kingdom | 74/551.9 |

Primary Examiner—Gary L. Smith
Assistant Examiner—Michael F. Trettel
Attorney, Agent, or Firm—Kinney & Lange

[57] ABSTRACT

A handlebar grip comprising a body member for engaging a handlebar as a grip, at least one shock absorbent layer for use overlaying the body member, and means on said body member for engaging the shock absorbent layer to prevent slippage of said layer with respect to the body member.

4 Claims, 5 Drawing Figures

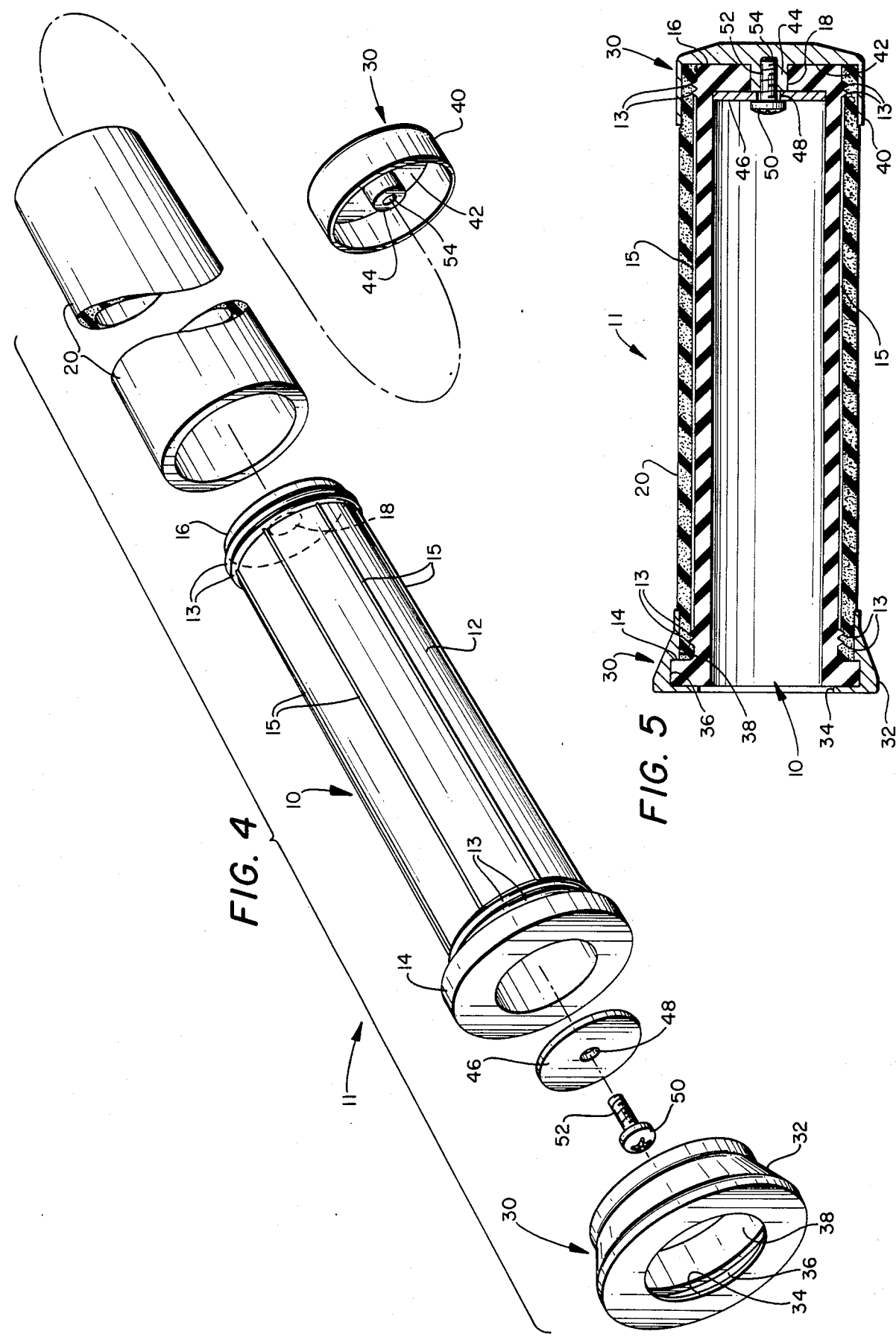

ANTI-SLIP HANDLEBAR GRIP

BACKGROUND OF THE INVENTION

Many machines and vehicles, and in particular motorcycles employ handlebars as a controlling means or device. Typically the handlebars are made of metal and usually tubular steel is used. Handlebar grips have been used in the past to alleviate many of the problems associated with handlebar usuage.

The use of handlebars on high powered, high speed vehicles or other machinery requires that the operator maintain a firm grip on the handlebar. The surface of the handlebars often has a very slick chrome plated finish and is almost always very smooth. This slick smooth surface can cause a loss of grip if the operator's palms become moist or dirty. To prevent this occurrence, handlebar grips have been used. Typically, the handlebar grips are made of a hard rubber or hard polymer material formed in a hollow cylindrical shape which can be hand pressed over the ends of the handlebars. The traction of the inside surface of the polymer tubular structure prevents the handlebar grip from slipping off the handlebar, thus, permitting the operator to retain better control of the machine by grasping the handlebar securely using the handlebar grip.

Other problems associated with the use of handlebars include discomfort caused by grasping a hot or cold steel handlebar. This problem too has generally been overcome by the prior art handlebar grip which tends to insulate the operator's hand from the cold metallic surface on winter mornings or alternately from the hot metallic surface when the handlebar has been sitting in the sun. Also, the handlebars may be manufactured with rough or jagged ends which can cause injury to the operator. To alleviate this problem the prior art handlebar grips are formed with one end closed so that it abuts against the end of the handlebar thereby covering any possible jagged edges left during the manufacture of the handlebar. To provide adequate protection and to prevent slipping, the handlebar grips have of necessity been formed of durable hard polymer material.

Another problem with prior art handlebar grips is the problem of fatigue to the hand caused by continuous vibrations transmitted from the machine through the handlebars. Particularly in the use of motorcycles, the operator's hands are subjected to continuous high frequency vibration caused by reciprocating engines which operate at high rpm's. The effect of this vibration transmitted to the operator through the hard rubber handlebar grip can be fatigue and numbing of the hands and fingers. This situation is potentially dangerous especially to the operators of high speed vehicles such as motorcycles with inherent characteristics requiring hands on the controls at all times. Another unsolved problem relates to wear and tear and weather deterioration of the exterior surface of the handlebar grips. Such wear characteristics are further exacerbated by the user constantly gripping and rubbing the handlebar grips. Prior art attempts to alleviate the fatigue problem have included such items as flexible ribs formed on the outer surface of the hard rubber grip. These ribs are particularly susceptible to wear because of the reduced surface area and the reduced durability of the flexible ribs which come in contact with the operator's hands. The result has been accelerated wearing of the handlebar grips requiring frequent expensive replacement. These problems were solved by the inventive handlebar grip set forth in commonly assigned copending patent application Ser. No. 319,898 filed Nov. 10, 1981 and entitled Handlebar Grip.

In the commonly assigned copending application, a handlebar grip was disclosed in which a shock absorber layer was provided for overlaying a body member handlebar grip to reduce hand fatigue and shock and means were included for replaceably attaching the shock absorbent layer to the body member.

However, the constant turning and gripping of the shock absorber layer may cause it to slip both longitudinally and circumferentially with respect to the body members. This slipping causes abnormal wear and requires accelerated replacement of the shock absorber layer.

SUMMARY OF THE INVENTION

The handlebar grip of the present invention not only alleviates those problems solved by prior art handlebar grips including the problems of vibratory fatigue and of expensive replacement, but also provides a handlebar grip with the same qualities as that disclosed in the commonly assigned copending application but prevents slippage between the shock absorber layer and the body member of the grip.

Thus, the present invention relates to a handlebar grip comprising a body member for engaging a handlebar as a grip, at least one shock absorbent layer for use overlaying the body member, and means on said body member for engaging the shock absorbent layer and preventing slippage of said layer with respect to the body member.

DESCRIPTION OF THE FIGURES

FIG. 4 is an exploded perspective view of the inventive HANDLEBAR GRIP; and

FIG. 5 is a cross section view of the HANDLEBAR GRIP showing the longitudinally and circumferentially extending ribs on the body member and their interrelationship with the shock absorbent layer to prevent slippage of the layer with respect to the body member.

DESCRIPTION OF THE PREFERRED EMBODIMENT

Figure 1:
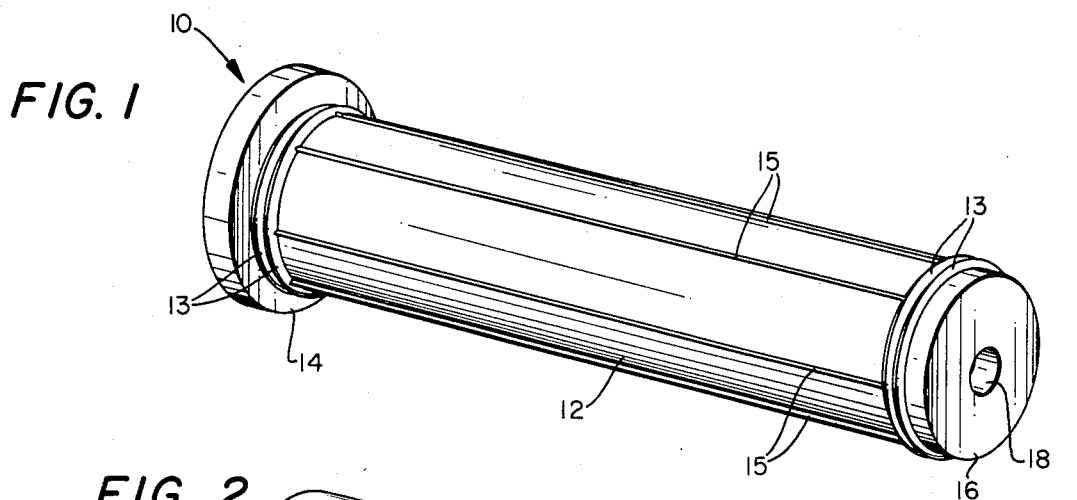
FIG. 1 is a perspective view of the grip body member illustrating the longitudinally and circumferentially extending ribs for engaging the shock absorbent layer.

FIG. 1 is a perspective view of the grip body member shown generally as numeral 10 which is composed of tube 12, shoulder 14, and plate 16. The shoulder 14, the tube 12, and the plate 16 in the preferred embodiment are integrally formed of a hard polymer material. Tube 12 has inside diameter slightly less than the outside diameter of the handlebar with which it is to be used. Thus, the elastic characteristics of the hard polymer allow the handlebar grip to be hand pressed onto a handlebar while inward radial elastic forces cause traction which inhibits sliding of the grip once it is in place. Tube 12 also includes circumferentially extending ribs 13 on each end thereof and a plurality of longitudinally extending ribs 15. These ribs 13 and 15 are used to grip shock absorbent layer 20 shown in FIG. 2 and in FIGS. 4 and 5. The longitudinal ribs 15 prevent rotation of said shock absorbent layer 20 about the circumference of said tube 12 while circumferentially extending ribs 13 engage said cylindrical shock absorber layer 20 and prevent movement of said layer along the longitudinal axis of said body member or tube 12.

Figure 2:
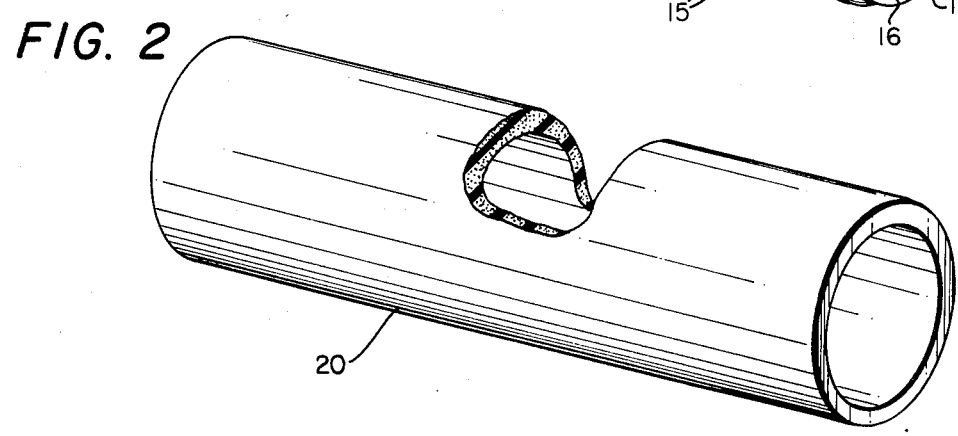
FIG. 2 is a perspective view of the shock absorbent layer.

FIG. 2 is a perspective view of the shock absorbent layer 20. In the preferred embodiment, shock absorbent layer 20 may be a tube formed of a sponge rubber material with an inside diameter similar to the outside diameter of tube 12.

Figure 3:
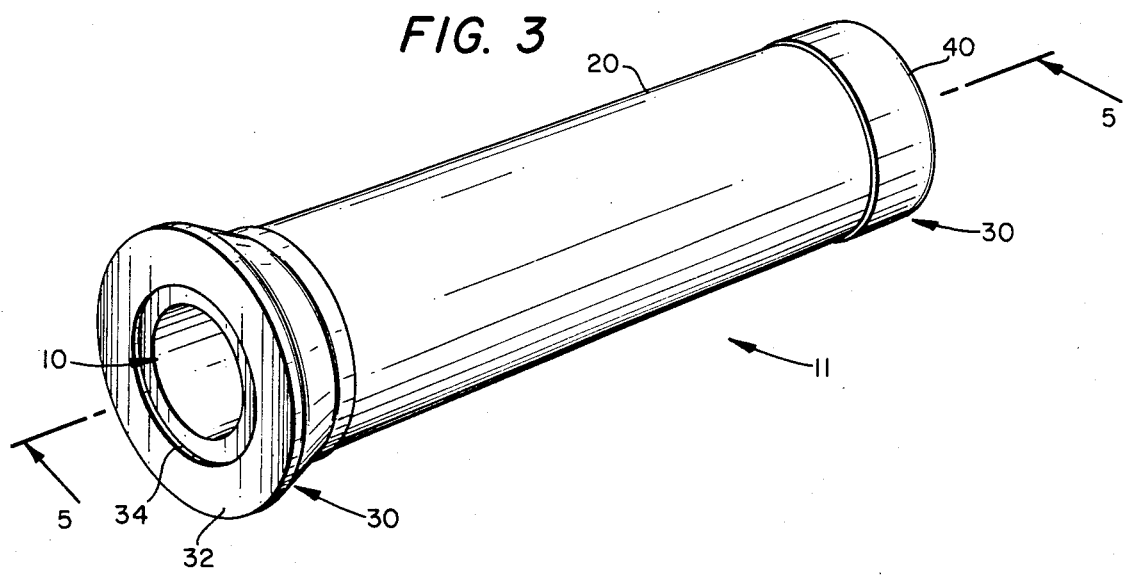
FIG. 3 is a perspective view of the assembled HANDLEBAR GRIP.

FIG. 3 is a perspective view of the handlebar grip assembly generally indicated by numeral 11 in which grip body member 10 is inserted into shock absorbent layer 20 and attached thereto by attachment means 30. Attachment means 30 is composed of coupling member 32 and cap 40. Both coupling member 32 and cap 40 are formed of a strong durable material. In the preferred embodiment, this material is metal.

The assembly of the handlebar grip can best be understood with reference to FIG. 4, which is an exploded perspective view of the handlebar grip, and with reference to FIG. 5 which is a cross sectional view of handlebar grip assembly 11. Tube 12 of grip body member 10 is slid into shock absorbent layer 20 so that one end of shock absorbent layer 20 abuts against shoulder 14 of grip body member 10 and so that plate 16 is adjacent to the opposite end of shock absorbent layer 20. Thus, the hard polymer material of grip body member 10 is surrounded by the sponge rubber material of shock absorbent layer 20. Ribs 13, extending about the circumference of each end of tube 12, engage the shock absorbent layer as shown in FIG. 5 and prevent longitudinal slippage of layer 20 with respect to tube 12 while longitudinal ribs 15 also engage the shock absorbent layer and prevent rotational slippage of layer 20 with respect to body member or tube 12.

In the preferred embodiment hard polymer shoulder 14, polymer tube 12 and shock absorbent layer 20 have sufficient flexibility to be inserted into coupling member 32 as can best be understood with reference to FIG. 5. Shoulder 14 is manually compressed and inserted through aperture 38 and is allowed to re-expand to its normal diameter thus engaging channel 36. Shock absorbent layer 20 and hard polymer tube 12 are also compressed together and inserted into aperture 38 so that upon re-expansion of the tube 12, shock absorbent layer 20 is held into position abutting against shoulder 14 by the tension created by the expansion of tube 12 against the relatively inelastic aperture 38 and is prevented from slippage with respect to tube 12 by means of ribs 13 and 15.

The end of shock absorbent layer 20 which is adjacent to hard polymer plate 16 is removably attached to grip body member 10 using cap 40. In the preferred embodiment, fastener boss 44 is attached to and integrally formed as a part of cap 40 and is inserted into orifice 18 formed in hard polymer plate 16. At the same time shock absorbent layer 20 is inserted into recess 42 of cap 40 as can be seen with reference to FIG. 5. Fastening plate 46 and fastener 50 shown in FIG. 4 are inserted through the inside of tube 12 so that fastening plate 46 abuts against hard polymer plate 16 and is connected to fastener boss 44 using threaded fastener 50 inserted through hole 48 so that male threads 52 mate with female threads 54 as shown in FIG. 5.

When the handlebar grip is positioned on the end of a handlebar, durable non-slip traction with respect to the handlebar is provided by the interior of hard polymer tube 12 while shock absorbent layer 20 provides a soft non-numbing grasping surface for use by the operator. In addition, ribs 13 and 15 on body member or tube 12 grip the shock absorbent layer 20 and prevent relative slippage, both longitudinally and circumferentially, between tube 12 and layer 20. Thus, improper operation and undue wear of the layer 20 is prevented. By disconnecting fastener 50, a user may remove cap 40 so that, if necessary, a worn shock layer 20 may be replaced with a new shock absorbent layer. This alleviates the expensive replacement of the entire handlebar grip when the exposed surface becomes worn or deteriorated.

Thus, there has been disclosed a novel and unique handlebar grip that not only provides a durable shock absorbent feature but also enables outer parts of the grip to be replaced when worn without requiring replacement of the more durable and expensive hard polymer or inner parts. Further, the invention reduces wear of the shock absorbent layer by preventing slippage between the inner part and the outer shock absorbent layer.

While the invention has been described in connection with a preferred embodiment, it is not intended to limit the scope of the invention to the particular form set forth, but, on the contrary, it is intended to cover such alternatives, modifications and equivalents as may be included within the spirit and scope of the invention as defined in the appended claims.

What is claimed is:

1. A handlebar grip comprising:
   a. a body member for engaging a handlebar as a grip, the body member comprising:
      1. a hard polymer tube having one end open for slipping partially onto one end of said handlebar and the other end closed and having an orifice therein of a diameter smaller than the inside diameter of said tube and with a hard polymer shoulder integrally formed on said open end of said tube and extending outwardly perpendicular to the outer surface of said tube, said hard, polymer tube also comprising at least one rib extending circumferentially about each end of said tube for engaging a cylindrical shock absorbent layer and preventing movement of said cylindrical shock absorbent layer along the longitudinal axis of said tube, and
      2. a plurality of ribs extending along the longitudinal axis of the outer surface of said tube to engage said shock absorbent layer and prevent rotation of said shock absorbent layer about the circumference of said tube;
   b. said shock absorbent layer being formed of a sponge polymer material for use overlaying said body member; and wherein said shock absorbent layer is a sponge polymer cylinder with both ends open and having an inside diameter similar to the outside diameter of said hard polymer tube thereby permitting said longitudinally and circumferentially extending ribs on said tube to engage said sponge polymer and prevent longitudinal and circumferential slippage between said sponge polymer and said hard polymer tube when said hard polymer tube is inserted into said sponge polymer cylinder such that one end of said sponge polymer cylinder abuts against said hard polymer shoulder and the other end of said sponge polymer cylinder is conterminous with the other closed end of said hard polymer tube; and c. means on said body member for engaging said shock absorbent layer and preventing slippage of said layer with respect to said body member.

2. A handlebar grip as in claim 1 further including:

a. a metallic coupling member fitting snugly over said hard polymer shoulder and at least a portion of said one end of said sponge polymer cylinder so as to couple said hard polymer tube to said sponge polymer cylinder; and b. a metallic cap overlaying and attached to corresponding other ends of said hard polymer tube and said sponge polymer cylinder.

3. A handlebar grip as in claim 2 further including:

a. a fastener boss formed inside of said metallic cap for extending through said orifice in said closed end of said hard polymer tube;

b. a fastening plate for fitting inside said hard polymer tube in abutting relationship with said fastener boss; and c. means for attaching said fastening plate to said fastener boss thereby gripping said closed end of said hard polymer tube between said fastening plate and said metallic cap.

4. A handlebar grip as in claim 3 wherein said fastener boss has female threads and said attaching means has male threads for mating with female threads.

* * * * *